United States Patent [19]
Matsuo et al.

[11] 3,773,284
[45] Nov. 20, 1973

[54] CONTROLLABLE MULTI-STAGE INCREASING DRAG PARACHUTE

[75] Inventors: Jon T. Matsuo; Lawrence E. Neipling, both of El Centro, Calif.

[73] Assignee: The United States of America as represented by the Secretary of the Army, Washington, D.C.

[22] Filed: Feb. 25, 1972

[21] Appl. No.: 229,414

[52] U.S. Cl. .............................. 244/142, 244/152
[51] Int. Cl. ..................... B64d 17/08, B64d 17/34
[58] Field of Search ............................ 244/142, 152

[56] References Cited
UNITED STATES PATENTS
| | | | |
|---|---|---|---|
| 2,371,898 | 3/1945 | Lisi | 244/152 |
| 2,970,795 | 2/1961 | Gold | 244/152 X |
| 3,278,142 | 10/1966 | Marshall | 244/149 |
| 3,599,908 | 8/1971 | Martin | 244/152 |

Primary Examiner—Duane A. Reger
Assistant Examiner—Carl A. Rutledge
Attorney—R. S. Sciascia et al.

[57] ABSTRACT

A multi-stage increasing drag parachute in which the canopy dray area is increased in predetermined controlled increments by means of an integral, variable length centerline, the length of which is controlled at a point remote from the canopy, each deployed canopy increment being self-sustaining as an independent and integral portion of the whole canopy.

10 Claims, 4 Drawing Figures

3,773,284

CONTROLLABLE MULTI-STAGE INCREASING DRAG PARACHUTE

CROSS REFERENCE TO RELATED APPLICATIONS

The invention is related to our co-pending application filed by the same co-inventors on 25 June 1971 under Ser. No. 156,750 entitled "A Controlled Multi-Stage Decreasing Drag Parachute."

BACKGROUND OF THE INVENTION

This invention relates to multi-stage canopy parachutes, and more particularly to such parachutes in which the drag area is increased in predetermined controlled increments during deployment.

The well established technique employed for increasing drag area of a parachute, that is, to enlarge the drag area after initial deployment, is by canopy reefing. Reefing in most instances is accomplished initially by restricting the mouth opening of the entire canopy by a reefing line or the like. At a predetermined time the reefing line is severed by a cutting device to open the canopy to the next or final reefing stage, intermittently or continously, depending on the number of reefing stages required. This method of canopy drag-area control may be applied for many purposes; namely, to limit canopy opening-forces to a predetermined value; to attain a preliminary high rate of descent to achieve accurate drops; for brake-type parachutes, etc. In U.S. Patent No. 2,371,898 reefing is employed by utilizing an annular peripheral drag surface having elastic suspension lines which are elongated under excessive forces to spill the air caught therein and thereby reduce the drag force.

SUMMARY OF THE INVENTION

In all of the prior art reefing parachutes for obtaining an increasing drag, the canopy when initially reefed is in a restricted and modified configuration. Standard Navy regulations require the reefed parachute canopy not be below 20 percent of the total effective drag area of the entire parachute, to avoid the danger of canopy collapse. In addition, in the reefing line systems, the point of control must of necessity be inside or adjacent the canopy hem. Thus, the reefing line said cutters are located on the parachute at the point of highest stress where high speed can tear them from the canopy and cause premature disreefing.

The use of resilient suspension lines for multi-stage parachute systems as provided in the above mentioned patent has limitations in that the control is segmented, producing unpredictable drag and stability.

The present invention enables the parachute to create an increasing drag force controllable at a location well outside the canopy, where there is less likelihood of damage compared to the reefing line techniques.

It is another important feature of this invention that each canopy stage or increment as deployed can be made to be an exact duplicate of its corresponding configuration as it appears in the fully deployed canopy. In other words, the first parachute stage can be made as an independent parachute canopy and not change its configuration during the filling process.

One contemplated application of the instant parachute is in the Navy's T-33 aircraft ejection seat drogue retardation and stabilization system. The invention will insure positive seat-man separation with a higher velocity differential. This feature is particularly pertinent at low speeds when the rate of man-seat separation becomes critical because the deployment velocity of the low mass parachute assembly could overrun the seat to cause possible entanglement, damage, and failure.

STATEMENT OF THE OBJECTS OF THE INVENTION

A principal object of this invention is to provide a multi-stage increasing drag parachute wherein the initial stage has the same configuration when initially activated as it does in the fully deployed parachute; in other words, the stage may be said to be independent and self-sustaining.

Another important object is to provide such a parachute with the drag stage controls at a location remote from the canopy.

Further objects are to provide a multi-stage parachute which is more versatile in that it can be varied in design to accommodate practically any conceivable operational requirement; and to provide a parachute which is simple and more reliable.

Another important object is to provide a multi-stage increasing drag parachute by the controlled continuous or intermittent lengthening of the centerline for gradual or rapid increase of parachute drag area.

Other objects, advantages and novel features of the invention will become apparent from the following detailed description of the invention when considered in conjunction with the accompanying drawings.

DESCRIPTION OF THE PREFERRED EMBODIMENT

Figures 1, 3, 4:
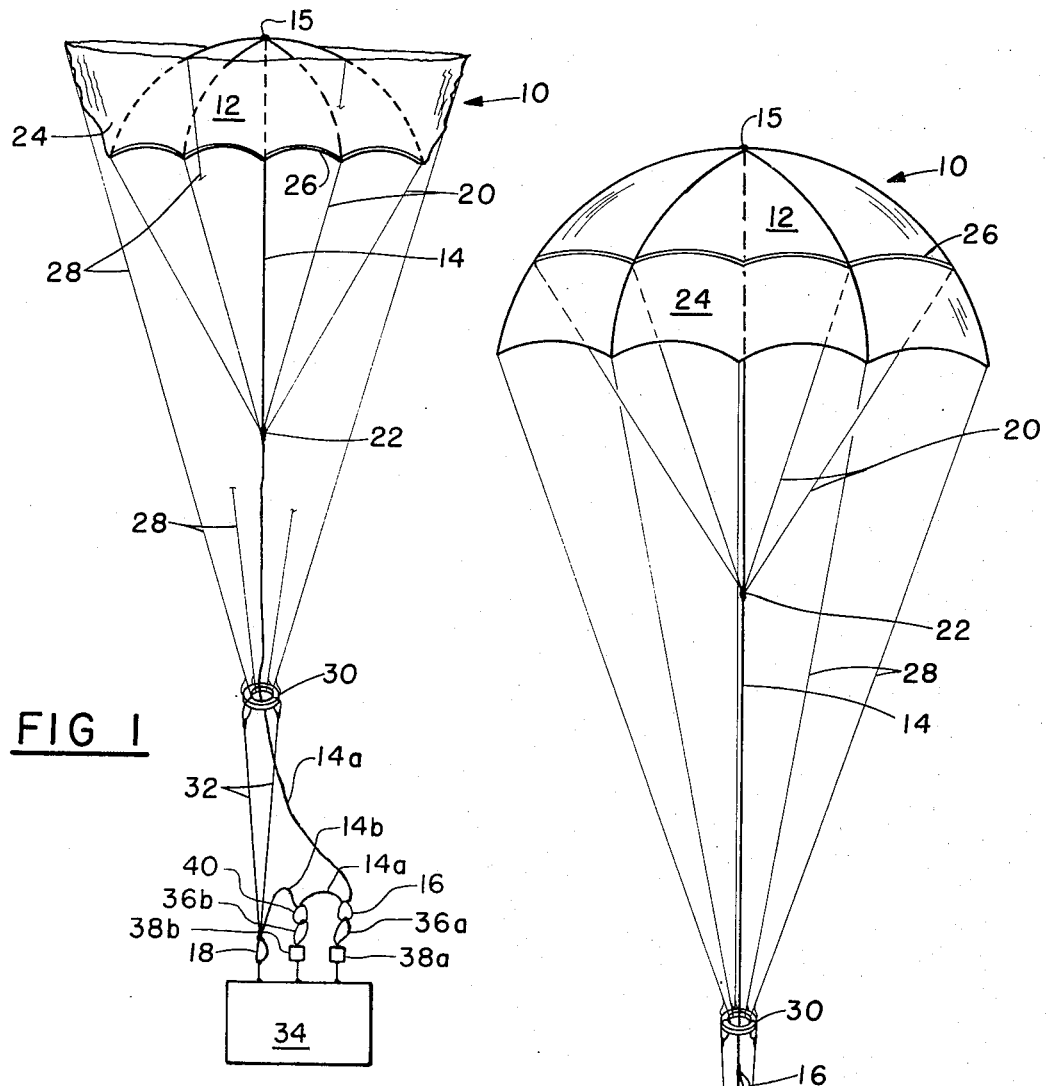
FIG. 1 is a side elevation of the extended novel multi-stage parachute deployed in the initial operational stage.
FIG. 3 is a similar view as FIG. 2 with the third or final canopy stage deployed.
FIG. 4 is an enlarged partial elevation showing the details of the manner of anchoring the canopy suspension lines in relation to the centerline.

Referring to the drawings where like reference numerals refer to similar parts throughout the figures, there is shown in FIG. 1 the novel multi-stage parachute 10 of this invention illustrated as a main parachute, although it is obvious that the invention can be utilized in other parachute applications, i.e., a pilot-drogue type. FIG. 1 illustrates the first stage of the parachute as initially deployed in which first stage canopy 12 is itself a complete parachute canopy occupying the central portion of the composite canopy. Although the described embodiment is a tri-stage parachute, the invention can be applied to a parachute having any number of stages that may be required to accomplish a specific task.

Parachute 10 includes a centerline 14 extending vertically from the apex 15 of the first stage canopy 12 downward to a load 34 connected by spaced centerline release loops 16 and 40. One load loop is provided for each stage, loop 16 being the second stage loop and load loop 40 being a third stage loop. Canopy 12 has a conventional set of suspension lines 20 connected at their upper ends to the canopy hem, and extending downwardly and fixedly secured in any appropriate manner to centerline 14 at an intermediate point 22 (see FIG. 4). Centerline 14, with load loop 16 integrally formed therein at an intermediate location, is the main force carrying member for the first stage. It should be noted that the first stage canopy 12, as shown in FIG. 1, retains its original configuration at the center of the parachute from the time it is first deployed as shown in FIG. 1, to the second stage parachute shown in FIG. 2 to the fully opened parachute shown in FIG. 3.

A canopy 24 forms the second and third stages and is in annular form sewn or otherwise made integral with the hem of first stage canopy 12 through a fabric reinforcement band 26. The first, second and third stage canopies can be made of one piece of material or made separately and joined together as illustrated. A second or outer set of suspension lines 28 are connected at their upper ends to the hem of second and third stage canopy 24 and extend downwardly to be secured around a fabric or metal ring 30 which acts as the confluence hardware for the second and third stages (see FIG. 4). Centerline 14 extends freely through ring 30 and is guided thereby during second and third stage deployment and development. Straps 32 connect ring 30, and suspension lines 28, to load loop 18 and load 34, where the lower end of centerline 14 is also anchored.

When first canopy stage 12 is initially deployed both loops 16 and 40 are secured together to the load by tie lines 36a and 36b and line cutters 38a and 38b respectively, creating slack portions 14a and 14b in the centerline. The line cutters may be of conventional design and may be operated by a time delay or any other suitable control. Thus in first canopy stage operation displayed in FIG. 1, the total drag force created by canopy 12 is transmitted via centerline 14 to load loop 16. Canopy 24 and suspension lines 28 are in an inactive or "flag" condition fluttering in a trailing condition, and any "flag" drag force created thereby is transmitted through ring 30 and straps 32 to load loop 18.

Figure 2:
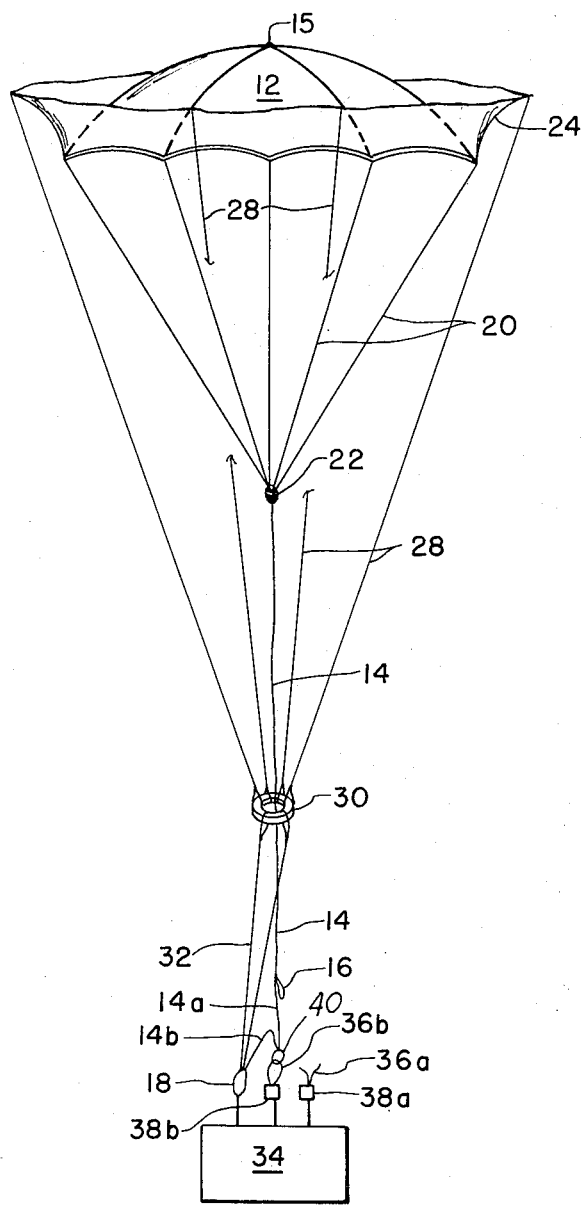
FIG. 2 is a similar view as FIG. 1 with the second canopy stage inflated.

During normal operation, one second after deployment of first stage canopy 12 (FIG. 1) cutter 38a is operated to sever tie line 36a to release loop 16 from the load to enable the parachute to achieve the second stage (FIG. 2.). It is obvious that any desired time delay can be built into the line cutter as is required. Loop 16 and its associated folded or slack portion 14a of centerline 14 is now free to be straightened by the drag force on canopy 12 allowing a corresponding upward movement of first stage canopy 12, centerline 14 being threaded through guide ring 30. The length of centerline 14 in the second stage is only partially extended, as shown in FIG. 2, allowing second stage canopy 24 to assume an intermediate, partially opened condition, spilling less air than in FIG. 1. Thus, partially opened canopy 24 and first stage canopy 12 forms the complete second stage composite canopy.

After another predetermined lapse of time (i.e., 2 seconds) after the development of the second stage (FIG. 2) cutter 38b is actuated to sever tie line 36b to release loop 40 from the load. Loop 40 and its associated slack portion 14b of the centerline is now free to be straightened by the drag force on canopy 12 allowing a corresponding upward movement of first stage canopy 12, centerline 14 being threaded through guide ring 30 for the second time.

The length of centerline 14 is such that when fully extended, as shown in FIG. 3, canopy 24 assumes its fully inflated orientation which is the normal operational position and with first stage canopy 12 forms the full and final composite canopy.

It is obvious that within the teaching of the present invention a number of different composite parachutes can be readily designed to handle different operational requirements. For example, the second and third stages can be separately constructed each with their own annular canopy, instead of being a single piece of fabric. In such a modified three-stage construction it may be desirable to provide a third set of suspension lines attached to a second centering ring. Likewise, if only a two-stage parachute is required one set of folded centerline portions, i.e., 14a and its associated loop 16, tie line 36a and line cutter 38a can be eliminated easily. Thus it is apparent that any desired number of parachute stages can be achieved, each having its own set of suspension lines and associated release apparatus. Of course, the amount of delay times designed into the line cutters depend on the operational requirements, the values given herein being exemplary only.

The novel multi-stage parachute of this invention provides design versatility in the various stages for practically any conceivable operational requirements, and without requiring a change in the structural limitations of the aircraft where used in an aircraft deceleration application.

An increasing drag area control can be achieved in a parachute which is more simple, economical and safer. The staging control equipment in the present invention being located remote from the parachute canopy possesses a substantial operational advantage without taxing the state-of-the-art in parachute technology.

Obviously many modifications and variations of the present invention are possible in the light of the above teachings. It is therefore to be understood that within the scope of the appended claims the invention may be practiced otherwise than as specifically described.

What is claimed is:

1. A controlled multi-stage, increasing drag parachute comprising:

a canopy;

a vertical centerline connected at its upper end to the canopy apex and adapted to be connected at its lower end to a load;

a first set of suspension lines connected at their upper ends to spaced points about the canopy forming an intermediate hem and connected at their lower ends to the centerline to form a first stage canopy increment;

a second set of suspension lines connected at their upper ends to spaced points about an outer hem of the canopy and connected at their lower ends to the centerline to form a second stage canopy increment;

the points of connection of the first and second suspension lines sets being at vertically spaced locations on the centerline;

said parachute being opened initially with only the first stage canopy increment activated in its normally opened position, the second stage increment assuming a "flag" condition; and releasable means for activating the second stage canopy to form the complete canopy without modifying the configuration of the first stage increment.

2. The parachute of claim 1 wherein said releasable means maintains the centerline in a foreshortened condition and includes means for releasing the centerline to assume a longer length.

3. The parachute of claim 1 wherein a plurality of releasable means are provided for progressively enabling the length of the centerline to be increased.

4. The parachute of claim 3 wherein said plurality of releasable means enables the second stage canopy increment to achieve corresponding degrees of drag.

5. The parachute of claim 2 wherein said releasable means is a loop formed in the centerline at a location between the load and the point of connection of the first set of suspension lines.

6. The parachute of claim 2 wherein said releasable means includes a line connecting said loop to the load and having a device for releasing said loop.

7. The parachute of claim 1 wherein said second set of suspension lines are attached to the load through a ring, and said centerline extends freely through said ring.

8. The parachute of claim 7 wherein said ring is connected to the load by a set of strap-like members.

9. A controlled multi-stage, increasing drag parachute comprising:
   a first stage canopy;
   a vertical centerline connected at its upper end to the canopy apex and having a first connection formed at its lower end for attachment to a load;
   a first set of suspension lines connected at their upper ends to spaced points around the canopy forming an intermediate hem and attached at their lower ends to the centerline at an intermediate point;
   a second stage canopy of annular configuration formed about the hem of the first stage canopy and provided with an outer hem;
   a second set of suspension lines connected at their upper end to spaced points about the hem of the second stage canopy and connected at their lower end to a ring through which the centerline is freely threaded;
   flexible means connecting said ring to the load;
   a second connection formed in said centerline at a point intermediate the first connection and the point of attachment of the first set of suspension lines for maintaining said centerline in a foreshortened length;
   means for releasing said second connection upon the occurrence of a predetermined event;
   whereby upon parachute deployment the first canopy stage will assume a normal open configuration with the drag force transmitted to the load through the foreshortened centerline with second stage canopy and its corresponding suspension lines in an inactive "flag" condition, and subsequent release of said second connection will allow the centerline to assume its straightened length; and allow the first stage canopy to move relative to the second stage canopy to permit the latter to present a full drag force on the load.

10. Th parachute of claim 8 wherein a plurality of connections are provided in the centerline at spaced points between the load and point of attachment of the first set of suspension lines, and separate releasing means are provided for each of said connections whereby said centerline is released in increments to provide corresponding degrees of drag area.

* * * * *